United States Patent
Chapelle et al.

(10) Patent No.: US 7,836,000 B2
(45) Date of Patent: Nov. 16, 2010

(54) SYSTEM AND METHOD FOR TRAINING A MULTI-CLASS SUPPORT VECTOR MACHINE TO SELECT A COMMON SUBSET OF FEATURES FOR CLASSIFYING OBJECTS

(75) Inventors: Olivier Chapelle, Mountain View, CA (US); Sathiya Keerthi Selvaraj, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 566 days.

(21) Appl. No.: 12/001,932

(22) Filed: Dec. 10, 2007

(65) Prior Publication Data
US 2009/0150309 A1 Jun. 11, 2009

(51) Int. Cl.
G06F 15/18 (2006.01)
G06E 1/00 (2006.01)
G06E 3/00 (2006.01)
G06G 7/00 (2006.01)

(52) U.S. Cl. ...................................................... 706/20
(58) Field of Classification Search ..................... 706/20
See application file for complete search history.

(56) References Cited

U.S. PATENT DOCUMENTS

| | | | |
|---|---|---|---|
| 7,318,051 B2* | 1/2008 | Weston et al. | 706/12 |
| 7,386,527 B2* | 6/2008 | Harris et al. | 706/59 |
| 7,475,048 B2* | 1/2009 | Weston et al. | 706/20 |
| 7,533,076 B2* | 5/2009 | Harris et al. | 706/59 |
| 7,617,163 B2* | 11/2009 | Ben-Hur et al. | 706/12 |
| 7,624,074 B2* | 11/2009 | Weston et al. | 706/1 |
| 7,734,071 B2* | 6/2010 | Heisele | 382/118 |
| 7,756,800 B2* | 7/2010 | Chidlovskii | 706/20 |

OTHER PUBLICATIONS

A new multi-class support vector machines, Xin Dong; Wu Zhaohui; Pan Yunhe; Systems, Man, and Cybernetics, 2001 IEEE International Conference on vol. 3 Digital Object Identifier: 10.1109/ICSMC. 2001.973525 Publication Year: 2001, pp. 1673-1676 vol. 3.*

(Continued)

*Primary Examiner*—Michael Holmes
(74) *Attorney, Agent, or Firm*—Law Office of Robert O. Bolan

(57) ABSTRACT

An improved system and method is provided for training a multi-class support vector machine to select a common subset of features for classifying objects. A multi-class support vector machine generator may be provided for learning classification functions to classify sets of objects into classes and may include a sparse support vector machine modeling engine for training a multi-class support vector machine using scaling factors by simultaneously selecting a common subset of features iteratively for all classes from sets of features representing each of the classes. An objective function using scaling factors to ensure sparsity of features may be iteratively minimized, and features may be retained and added until a small set of features stabilizes. Alternatively, a common subset of features may be found by iteratively removing at least one feature simultaneously for all classes from an active set of features initialized to represent the entire set of training features.

20 Claims, 5 Drawing Sheets

OTHER PUBLICATIONS

Classification of english phrases and SMS text messages using Bayes and Support Vector Machine classifiers, Maier, J.; Ferens, K.; Electrical and Computer Engineering, 2009. CCEC. '09. Canadian Conference on Digital Object Identifier: 10.1109/CCECE.2009.5090166 Publication Year: 2009 , pp. 415-418.*

Keyphrases extraction from Web document by the least squares support vector machine, Jiabing Wang; Hong Peng; Web Intelligence, 2005. Proceedings. The 2005 IEEE/WIC/ACM International Conference on Digital Object Identifier: 10.1109/WI.2005.87 Publication Year: 2005 , pp. 293-296.*

Web Host Access Tool: A Support Vector Machine Approach, Banerjee, S.; Cassel, L.; Neural Networks, 2006. IJCNN '06. International Joint Conference on Digital Object Identifier: 10.1109/IJCNN.2006.246824 Publication Year: 2006 , pp. 1176-1183.*

Forman G., An Extensive Empirical Study of Feature Selection Metrics for Text Classification, Journal of Machine Learning Research, 3:1289-1305, 2003.

Guyon I. and Elisseeff A., An Introduction to Variable and Feature Selection, Journal of Machine Learning Research, 3:1157-1182, 2003.

Guyon I., Weston J., Barnhill S., and Vapnik V. Gene Selection for Cancer Classification Using Support Vector Machines, Machine Learning, 46(1/3):389, 2002.

Madigan D., Genkin A., Lewis D. D., Argamon S., Fradkin D., and Ye L., Author Identification on the Large Scale, In Classification Society of North America, 2005.

Yang Y. and Pedersen J., A Comparative Study on Feature Selection in Text Categorization, in International Conference on Machine Learning, 1997.

* cited by examiner

SYSTEM AND METHOD FOR TRAINING A MULTI-CLASS SUPPORT VECTOR MACHINE TO SELECT A COMMON SUBSET OF FEATURES FOR CLASSIFYING OBJECTS

FIELD OF THE INVENTION

The invention relates generally to computer systems, and more particularly to an improved system and method for training a multi-class support vector machine to select a common subset of features for classifying objects.

BACKGROUND OF THE INVENTION

Text classification, the task of automatically assigning categories to natural language text, has become one of the key methods for organizing online information. Most modern approaches to text classification employ machine learning techniques to automatically learn text classifiers from examples. A large number of text classification problems occurring in practice involve many categories. They may be a multi-class type assigning exactly one class to each document or a multi-labeled type assigning a variable number of classes to each document. Typically these problems involve a very large feature space where the features consist of a large vocabulary of words and phrases. The features representing a document may be many times the size of the representation of a document. Unfortunately, processing such a large feature set exhausts computational resources.

Feature selection is an important component of text classification with machine learning techniques. It is used to help reduce the load on computational resources and, in cases where there are many noisy features, to help in lifting the performance by eliminating such features. Several feature selection methods have been suggested in the literature, particularly with respect to binary classification. In general, feature selection methods have been categorized into three types: filter, wrapper and embedded methods. See for example, I. Guyon and A. Elisseeff, *An Introduction to Variable and Feature Selection*, Journal of Machine Learning Research, 3:1157-1182, 2003. Filter methods select features as a preprocessing step, independently of the prediction method. Because text classification involves a large number of features and filter methods are computationally very efficient, they have been popularly used in text classification. For comparisons of a number of filter methods for text classification, see Y. Yang and J. Pedersen, *A Comparative Study on Feature Selection in Text Categorization*, in International Conference on Machine Learning, 1997, and G. Forman, *An Extensive Empirical Study of Feature Selection Metrics for Text Classification*, Journal of Machine Learning Research, 3:1289-1305, 2003. These studies show information gain, chi-squared and bi-normal separation as the leading filter measures. Wrapper methods use the prediction method as a black box to score subsets of features. In text classification they have not been tried because of their expensive need to try out a very large number of subset selections. Finally, embedded methods perform feature selection as part of the training process of the prediction method.

Support Vector Machines (SVMs) are an important class of methods for generating text classifiers from examples. SVMs combine high performance and efficiency with improved robustness. Embedded methods for feature selection with SVMs include linear classifiers that use $L_1$ regularization on the weights and recursive feature elimination, a backward elimination method that uses smallness of weights to decide feature removal. See for example, D. Madigan, A. Genkin, D. D. Lewis, S. Argamon, D. Fradkin, and L. Ye, *Author Identification on the Large Scale*, In Classification Society of North America, 2005, and I. Guyon, J. Weston, S. Barnhill, and V. Vapnik. *Gene Selection for Cancer Classification Using Support Vector Machines*, Machine Learning, 46(1/3):389, 2002. Unfortunately, feature selection is performed independently for the various binary classifiers. Because features are removed on a class by class basis, the importance of a feature to other classes is not considered when removing features.

What is needed is a system and method for an SVM to learn classifications function and perform simultaneous feature selection to find a small set of features which are good for all the classifiers. Such a system and method should be able to be used by online applications for multi-class text classification where the text content may change rapidly.

SUMMARY OF THE INVENTION

Briefly, the present invention may provide a system and method for training a multi-class support vector machine using scaling factors to select a common subset of features for classifying objects. The scaling factors and the weight vectors of the Support Vector Machines are simultaneously optimized. The use of scaling factors ensures sparsity of the weight vectors and the level of the sparsity is controlled by a regularization parameter. Following a path tracking type of algorithm, this parameter is adjusted iteratively such that the number of active features is globally increasing. The algorithm stops when a maximum number of features has been reached or no additional features are needed. In a further embodiment, the final weight vectors are found by retraining a Support Vector Machine on the subset of features by the method described above.

In yet another embodiment, a small subset of features may be found by iteratively removing at least one feature simultaneously for all classes from an active set of features. Initially the active feature set may represent the entire set of training features. At each iteration, each class may be trained using the active feature set and then one or more features may be simultaneously removed for all classes. The process of iteratively removing at least one feature from the active feature set may repeat until the active set of features does not exceed a maximum number.

Advantageously, the present invention may be used by many applications for multi-class text classification including, for instance, serving contextual advertisements to publishers where the content of web pages such as chat pages, blog pages, a stream of news items, email, and so forth, may change rapidly, and classification of a web page may be performed online to select an advertisement according to the content. For any of these applications, the present invention may be used, especially when computational resources including memory, processing time, and network transmission time, require that textual content be represented using a small number of features. The present invention may also be applied to domains other than text classification, for example, bioinformatics.

Other advantages will become apparent from the following detailed description when taken in conjunction with the drawings, in which:

DETAILED DESCRIPTION

Exemplary Operating Environment

Figure 1:
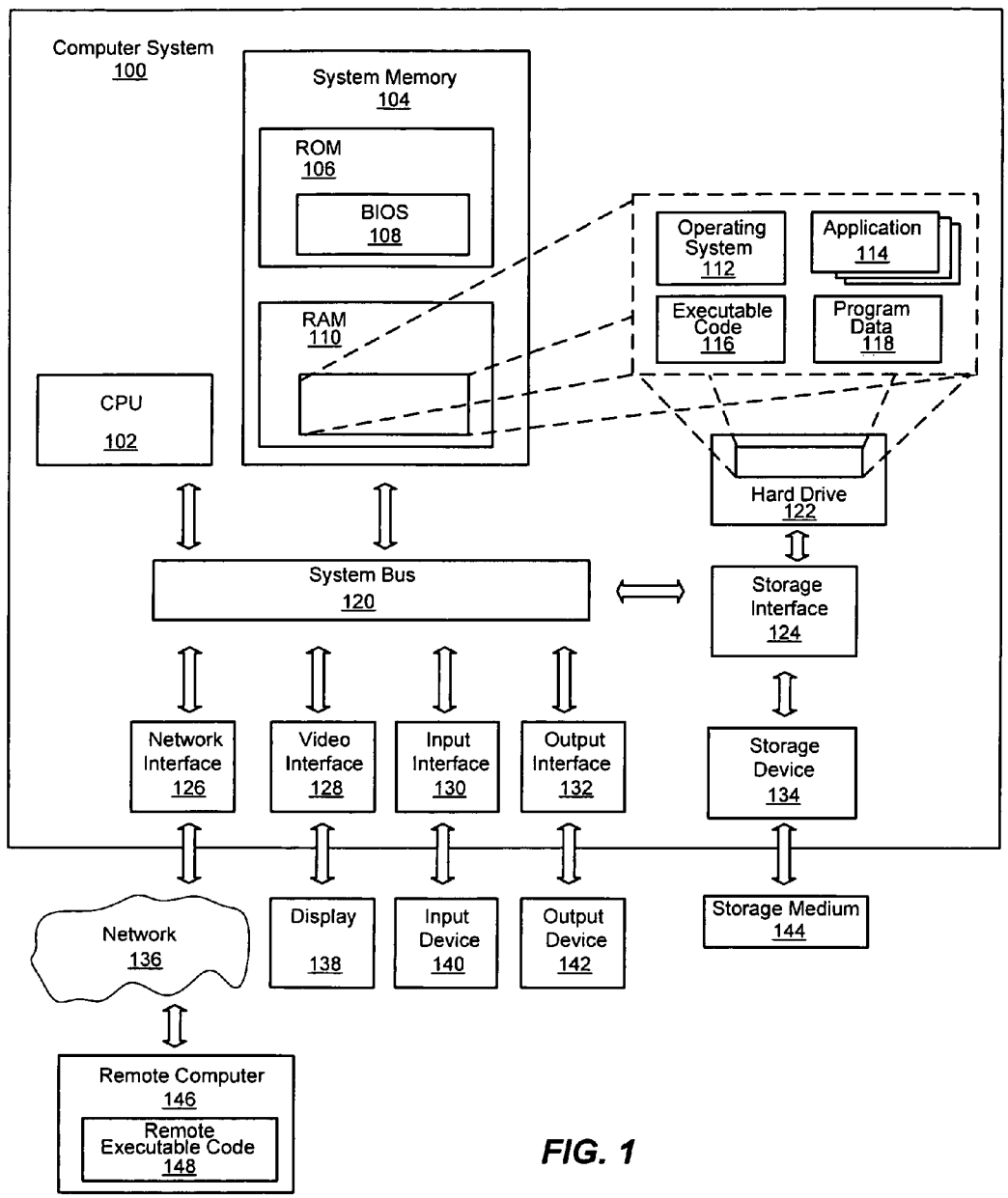
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Preliminaries

The present invention is generally directed towards a system and method for training a multi-class support vector machine to select a common subset of features for classifying objects. SVMs are an important class of methods for generating text classifiers from examples, since SVMs combine high performance and efficiency with improved robustness. The system and method of the present invention may iteratively minimize an objective function using scaling factors to ensure sparsity of features and features may be retained and added until a small common subset of features stabilizes for use in classifying objects. A sparse support vector machine (SSVM) may then be generated by training a SVM using the common subset of features for use in classifying unseen objects.

As will be seen, the small common subset of features may be found by iteratively selecting features from sets of training features simultaneously for all classes in various embodiments and may also be found by removing features simultaneously for all classes from an active set of features in other embodiments. As will be understood, the various block diagrams, flow charts and scenarios described herein are only examples, and there are many other scenarios to which the present invention will apply.

Figure 2:
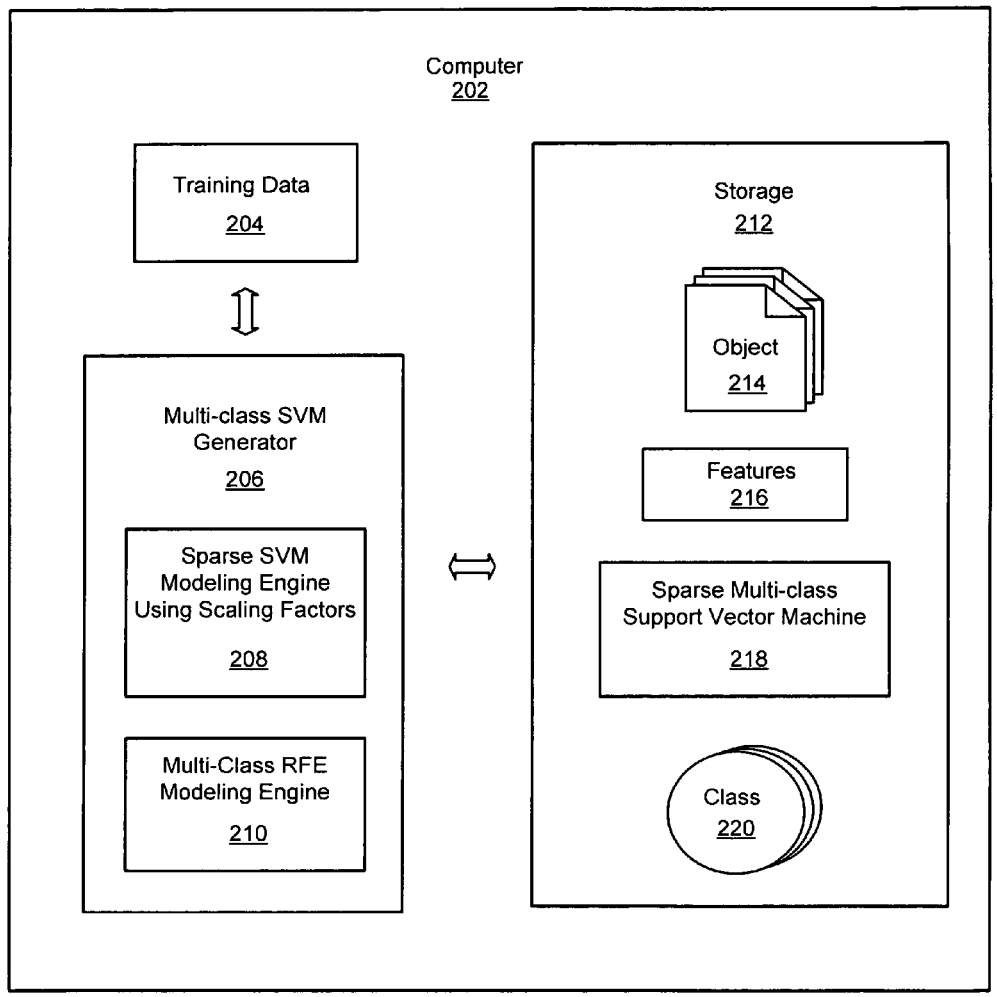
FIG. 2 is a block diagram generally representing an exemplary architecture of system components for training a multi-class support vector machine based on scaling factors to select a common subset of features for classes of objects, in accordance with an aspect of the present invention.

Overall Architecture for Training a Multi-Class Support Vector Machine to Select a Common Subset of Features Turning to FIG. 2 of the drawings, there is shown a block diagram generally representing an exemplary architecture of system components for training a multi-class support vector machine based scaling factors to select a common subset of features for classes of objects. Those skilled in the art will appreciate that the functionality implemented within the blocks illustrated in the diagram may be implemented as separate components or the functionality of several or all of the blocks may be implemented within a single component. For example, the functionality of the sparse support vector machine modeling engine 208 may be implemented as a separate component from the multi-class support vector machine generator 206. Moreover, those skilled in the art will appreciate that the functionality implemented within the blocks illustrated in the diagram may be executed on a single computer or distributed across a plurality of computers for execution.

In various embodiments, a computer 202, such as computer system 100 of FIG. 1, may include a multi-class support vector machine generator 206 operably coupled to storage 212. In general, the multi-class support vector machine generator 206 may be any type of executable software code such as a kernel component, an application program, a linked library, an object with methods, and so forth. The storage 212 may be any type of computer-readable media and may store a sparse multi-class support vector machine 218 that may classify objects 214, such as text, using a set of features 216 into classes 220. In an embodiment, the objects 214 may be text documents that may be represented by features such as words or phrases. The average number of features occurring in a document may be quite large and it may be time consuming in text classification to process an individual set of different features for each class.

The multi-class support vector machine generator 206 may learn classification functions for each of the classes of objects and may include a sparse support vector machine modeling engine using scaling factors 208 for training a multi-class support vector machine by simultaneously selecting a common subset of features iteratively for all classes from sets of features representing each of the classes obtained from training data 204. The multi-class support vector machine generator 206 may also include a multi-class recursive feature elimination modeling engine 210 in an embodiment for selecting a common subset of features by iteratively removing at least one feature simultaneously for all classes from an active set of features. Each of these modules may also be any type of executable software code such as a kernel component, an application program, a linked library, an object with methods, or other type of executable software code. Upon selecting a common subset of features iteratively for all classes, a sparse multi-class support vector machine 218 may be output with the common set of features for classifying the sets of objects into the classes of objects. In particular, the multi-class support vector machine generator 206 may generate a sparse multi-class support vector machine in an embodiment by retraining a support vector machine on the selected common subset of features.

There are many applications which may use the present invention for training a multi-class support vector machine to select a common subset of features for classes of objects. In general, a large number of text classification applications that involve many categories may use the present invention to represent the text using a small number of features. Such applications may be a multi-class application where exactly one class may be assigned to each text, such as learning the nodes of taxonomies, or the applications may be a multi-labeled application where a variable number of classes may be assigned to each text. Typically these applications involve a very large feature space where the features consist of a large vocabulary of words and phrases that may be many times the size of the representation of a text. For example, a document classification application may use the present invention to select only the relevant features among a very large number of features to speed up classification of documents.

Many web applications may use the present invention for multi-class text classification including, for instance, serving contextual advertisements to publishers where the content of web pages such as chat pages, blog pages, a stream of news items, email, and so forth, may change rapidly, and classification of a web page may be performed online to select an advertisement according to the content. For any of these applications, the present invention may be used, especially when computational resources including memory, processing time, and network transmission time, require that textual content be represented using a small number of features. Those skilled in the art will appreciate that the present invention may also be applied to domains other than text classification, for example, bioinformatics.

In the domain of text classification, Support Vector Machines (SVMs) are common machine learning techniques employed to automatically learn text classifiers from examples. Consider i to represent an index for documents 1 . . . n, j to represent an index for features 1 . . . d for each document, and k to represent an index for classes 1 . . . c. A training set $\{(x_i, y_i)\}_{1 \leq i \leq n}$ is given, where $x_i \equiv (x_{i1} \ldots x_{id})^T$ is the d dimensional vector representation of the i-th example and $y_i \equiv (y_{i1} \ldots y_{ic})^T$ is its label vector. An example, $y_{ik}$, may be assigned a value of 1 such that $y_{ik}=1$ if that example belongs to the k-th category; otherwise, $y_{ik}$ may be assigned a value of $-1$. A linear classier for the k-th class may use a d dimensional weight vector, $w_k$, with the associated classification function defined by $f_k(x)=w_k \cdot x$, $1 \leq k \leq c$. The j-th element of $w_k$ may be written as $w_{jk}$ and $w_k^2$ may denote the square of the Euclidean norm of $w_k$. Support Vector Machines may minimize the following objective function:

$$\frac{1}{2}w_k^2 + \frac{C}{2}\sum_{i=1}^n l(y_{ik}(w_k \cdot x_i)),$$

where l may represent a loss function, $l(t)=\max(0,1-t)^p$. Commonly used values for p are: $p=1$ and $p=2$. Although SVMs are often used to find non-linear decision boundaries through a kernel function, in text classification this additional step is not usually necessary and fast methods exist to train SVMs.

Figure 3:
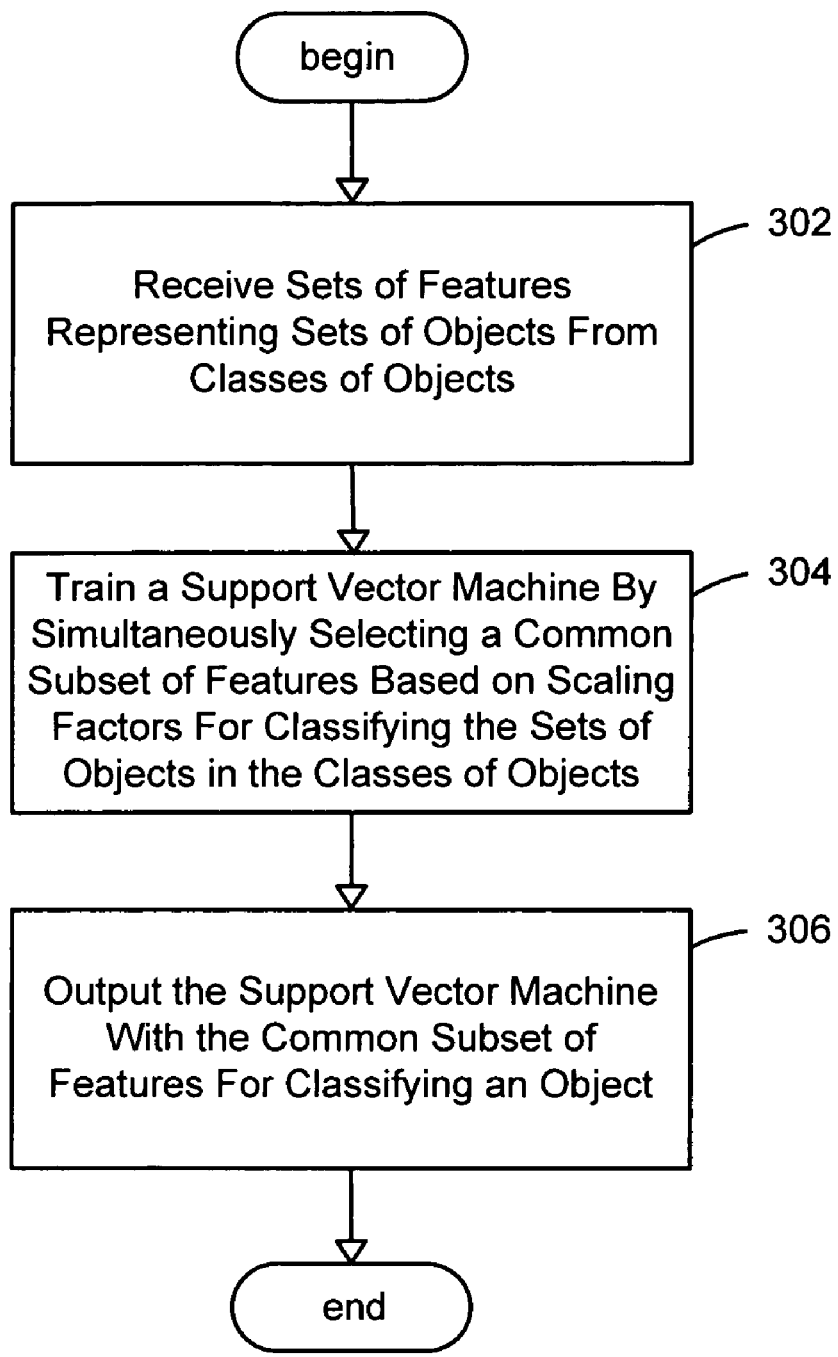
FIG. 3 is a flowchart generally representing the steps undertaken in one embodiment for training a support vector machine based on scaling factors to select a common subset of features for classifying objects, in accordance with an aspect of the present invention.

SVMs may be used for multi-class feature selection by using scaling factors to generate a SVM that may select a small set of features that yield good performance. The SVM may learn c classifications functions $f_k(x)=w_k \cdot x$, $1 \leq k \leq c$ and perform simultaneous feature selection to find a small set of features which are good for all the classifiers. For example, FIG. 3 presents a flowchart generally representing the steps undertaken in one embodiment for training a support vector machine based on scaling factors to select a common subset of features for classifying objects. At step 302, sets of features representing sets of objects from classes of objects may be received. These sets of features may be used as training data for training an SVM for classifying an unseen object in one or more classes of objects. At step 304, a SVM may be trained by simultaneously selecting a common subset of features based on scaling factors from the sets of training features for classifying the sets of objects into the classes of objects. Once a common subset of features may be selected, the support vector machine may then be output at step 306 with the common subset of features for classifying unseen objects into the classes of objects.

Training a Sparse Multi-Class Support Vector Machine with Scaling Factors to Select a Common Subset of Features Consider the case of finding a small set of m features. A natural optimization problem to solve is $$\min \frac{1}{2}\sum_{k=1}^c w_k^2 + \frac{C}{2}\sum_{i=1}^n l(y_{ik}\sqrt{\sigma_j}\,w_{jk}x_{ij}),$$

subject to the constraints $\sigma_j \in \{0,1\}$, $\Sigma \sigma_j = m$. Minimizing this objective function would result in selecting m features, those corresponding to $\sigma_j=1$, and effectively discarding the others. Unfortunately, this optimization problem is combinatorial and thus difficult to solve. By relaxing the constraint $\sigma_j \in \{0,1\}$ so that $\sigma_j \geq 0$ instead and by also making the change of variables $w_{jk} \leftarrow w_{jk}\sqrt{\sigma_j}$, a relaxed version of the optimization problem may be rewritten as $$\min \frac{1}{2}\sum_{k=1}^c \left( \sum_{j=1}^d \frac{w_{jk}^2}{\sigma_j} + C\sum_{i=1}^n l(y_{ik}(w_k \cdot x_i)) \right),$$

subject to the constraints $\sigma_j \geq 0$ and $\Sigma \sigma_j = m$. Note that the choice of $\sigma_j=0$ will correspond to $w_{jk}=0 \forall k$ and feature j being eliminated. This relaxed version of the optimization problem is a convex problem because the function $(x,y) \mapsto x^2/y$ is jointly convex.

Instead of having the constraint $\Sigma \sigma_j = m$, a Lagrange multiplier may be introduced by adding $$\frac{\lambda}{2}\sum \sigma_j$$

in the objective function to obtain $$\min \frac{1}{2}\sum_{k=1}^c \left( \sum_{j=1}^d \frac{w_{jk}^2}{\sigma_j} + \lambda \sum \sigma_j + C\sum_{i=1}^n l(y_{ik}(w_k \cdot x_i)) \right),$$

subject to the constraints $\sigma_j \geq 0$.

Note that this objective function is equivalent to the objective function $$\min \frac{1}{2}\sum_{k=1}^c \left( \sum_{j=1}^d \frac{w_{jk}^2}{\sigma_j} + C\sum_{i=1}^n l(y_{ik}(w_k \cdot x_i)) \right)$$

given above since, for every m, there exists a $\lambda$ such that the solutions are identical. Dividing the objective function $$\min \frac{1}{2}\sum_{k=1}^c \left( \sum_{j=1}^d \frac{w_{jk}^2}{\sigma_j} + \lambda \sum \sigma_j + C\sum_{i=1}^n l(y_{ik}(w_k \cdot x_i)) \right) \text{ by } \sqrt{\lambda},$$

making the change of variable $\sigma_j \leftarrow \sqrt{\lambda}\sigma_j$ and introducing $\tilde{C}=C/\sqrt{\lambda}$, the following form of the optimization problem may be obtained $$\min \frac{1}{2} \sum_{k=1}^{c} \left( \sum_{j=1}^{d} \frac{w_{jk}^2}{\sigma_j} + \sum \sigma_j + \tilde{C} \sum_{i=1}^{n} l(y_{ik}(w_k \cdot x_i)) \right),$$

subject to the constraints $\sigma_j \geq 0$. In this form of the optimization problem, the sparsity is not controlled by m anymore but by $\tilde{C}$. Thus, small values of $\tilde{C}$ will yield sparse solutions that find a small set of features which are good for all the classifiers.

To solve this problem based on the optimization of scaling factors to ensure sparsity, $$\min \frac{1}{2} \sum_{k=1}^{c} \left( \sum_{j=1}^{d} \frac{w_{jk}^2}{\sigma_j} + \sum \sigma_j + \tilde{C} \sum_{i=1}^{n} l(y_{ik}(w_k \cdot x_i)) \right),$$

a combination of a Newton-type algorithm and a path tracking algorithm may be used. In terms of training time, it is very efficient because it only involves sparse matrix vector multiplications, where the matrix contains the active features of the support vectors.

In an embodiment, finding a solution for this optimization problem based on scaling factors may generally be implemented by the following pseudo-code using a path tracking algorithm:

---
Path Tracking Algorithm
---
$\tilde{C} \leftarrow \epsilon$
F ← ∅
Repeat
    Repeat
    Starting from w, σ, $$\min \frac{1}{2} \sum_{k=1}^{c} \left( \sum_{j=1}^{d} \frac{w_{jk}^2}{\sigma_j} + \sum \sigma_j + \tilde{C} \sum_{i=1}^{n} l(y_{ik}(w_k \cdot x_i)) \right)$$

under constraints $w_{jk} = 0$ for $j \notin F$ and $\sigma_j \geq 0$;
    $F \leftarrow \{j \in F, \sigma_j > 0\}$     <Keep active features>

$F \leftarrow F \cup \{j \notin F, \|g_{jk}\| \geq 2/\tilde{C}\}$ with $$g_{jk} = \partial \sum_{i=1}^{n} l(y_{ik}(w_k \cdot x_i))/\partial w_{jk}$$

<Add new features>
    Until Set F is stabilized
Record F and w.
$\tilde{C} \leftarrow 1.3 \tilde{C}$
Until Convergence or F has reached maximum size

---

In this embodiment, $\tilde{C}$ may be increased from a small value to its final value. Given the solution and the set of active features for a given $\tilde{C}$, the new solution for a larger $\tilde{C}$ can be found efficiently because the set of active features is likely not to change too much.

Figure 4:
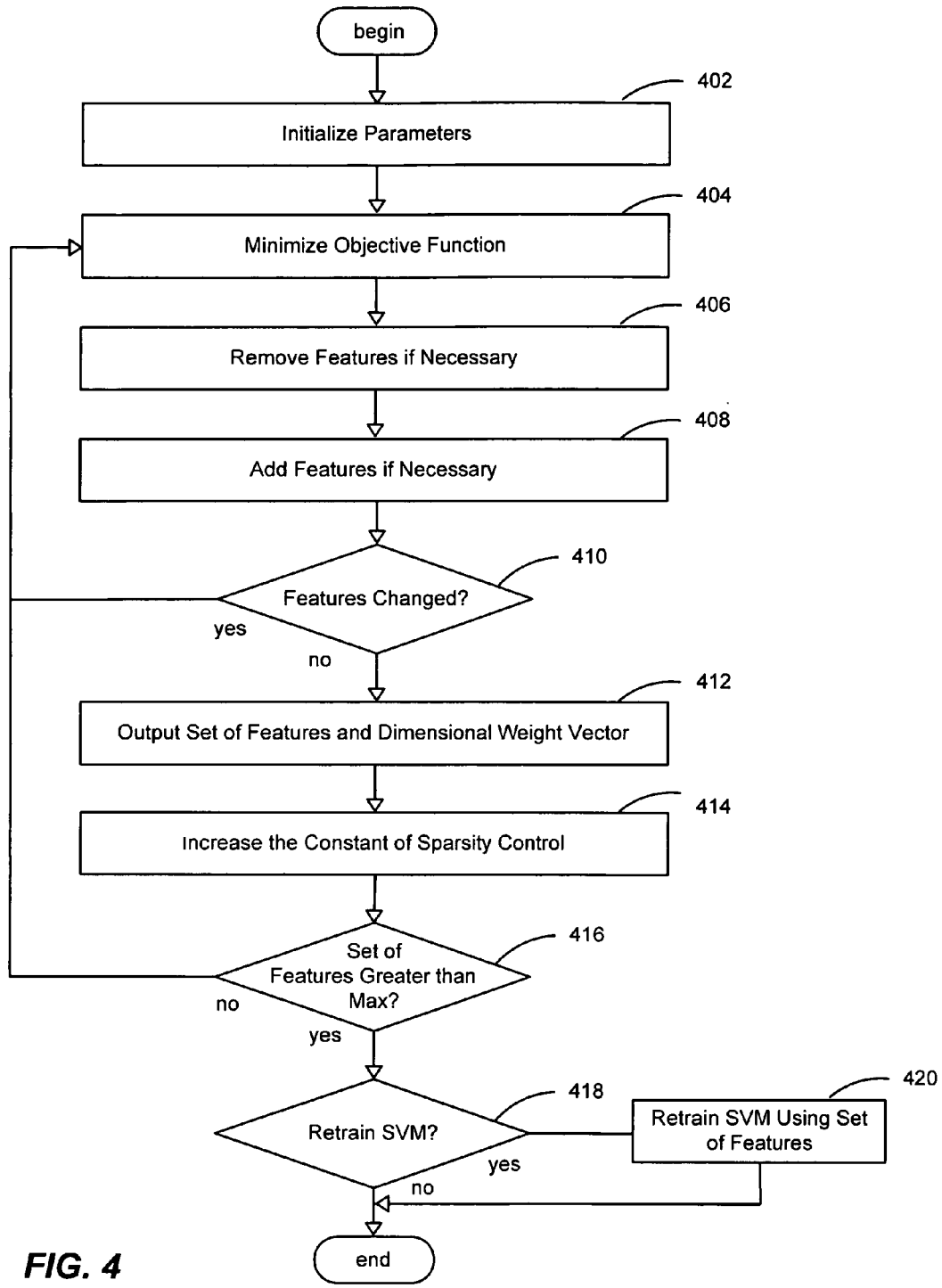
FIG. 4 is a flowchart generally representing the steps undertaken in an embodiment for training a sparse support vector machine using scaling factors to simultaneously select a common subset of features for classifying objects, in accordance with an aspect of the present invention.

FIG. 4 presents a flowchart generally representing the steps undertaken in one embodiment for training a sparse support vector machine by simultaneously selecting a common subset of features for classifying objects. The steps of FIG. 4 represent the general steps of the pseudo-code of the Path Tracking Algorithm presented above. At step 402, parameters for iteratively minimizing an objective function to select a small set of features may be initialized. In an embodiment, the constant for sparsity control may be set to a small value, $\tilde{C} \leftarrow \epsilon$, the active feature set may be set to empty, $F \leftarrow \emptyset$, and the values of a dimensional weight vector may be set to zero and the scaling factors set to 1: $w_{jk} \leftarrow 0$, $\sigma_j \leftarrow 1$. At step 404, an objective function using scaling factors to ensure sparsity of features, $$\min \frac{1}{2} \sum_{k=1}^{c} \left( \sum_{j=1}^{d} \frac{w_{jk}^2}{\sigma_j} + \sum \sigma_j + \tilde{C} \sum_{i=1}^{n} l(y_{ik}(w_k \cdot x_i)) \right),$$

may be iteratively minimized. At step 406, features with zero scaling factor may be removed. At step 408 additional features may be added to the features found if the addition of the feature would make the objective function smaller, as implemented in the Path Tracking Algorithm by $F \leftarrow F \cup \{j \notin F, \|g_{jk}\| \geq 2/\tilde{C}\}$ with $$g_{jk} = \partial \sum_{i=1}^{n} l(y_{ik}(w_k \cdot x_i))/\partial w_{jk}.$$

After features may be removed and features may be added, it may be determined at step 410 whether the set of features changed. If so, then processing may continue at step 404 to minimize the objective function. If not, the set of features, F, and dimensional weight vector, $w_k$, may be output at step 412. At step 414, the constant for sparsity control may be increased. For example, $\tilde{C} \leftarrow 1.3\tilde{C}$. At step 416, it may be determined whether the number of features is greater than a maximum number or the training error is 0, i.e. $\Sigma_{i,k} o_{ik}^2 = 0$, where $o_{ik} \leftarrow \max(0, 1 - y_{ik}(x_i \cdot w_k))$. If not, processing may continue at step 404 to minimize the objective function. Otherwise, it may be determined whether to retrain a SVM at step 418. If so, an SVM may be retrained at step 420 using the set of features and processing may be finished. The standard support vector machine retrained using these features may be called a Sparse Support Vector Machine (SSVM). In training the SSVM, the scaling factor values may be fixed so that the positive ones are replaced by 1 and the objective function $$\min \frac{1}{2} \sum_{k=1}^{c} w_k^2 + \frac{C}{2} \sum_{i=1}^{n} l\left( y_{ik} \sum_{j=1}^{d} \sqrt{\sigma_j} w_{jk} x_{ij} \right)$$

may be re-minimized for the $w_k$.

In another embodiment of step 404, the positivity constraint on the scaling factors is implemented by a log barrier to the objective function, such as $-t\Sigma \log(\sigma_j)$. Usually, t is decreased by steps, but here there is no need to vary t since the gradual change in $\tilde{C}$ already makes the optimization well behaved. Thus t is fixed to a relatively small value, $t = 10^{-3}$.

In a further embodiment of step 404, the implementation of the unconstrained minimization of $$\min \frac{1}{2} \sum_{k=1}^{c} \left( \sum_{j=1}^{d} \frac{w_{jk}^2}{\sigma_j} + \sum \sigma_j + \tilde{C} \sum_{i=1}^{n} l(y_{ik}(w_k \cdot x_i)) \right)$$

with the log barrier may use the Levenverg-Marquardt algorithm. See for example, R. Fletcher, *Practical Methods of Optimization* [3, Algorithm 5.2.7], John Wiley and Sons, 1987. The Levenverg-Marquardt algorithm is basically a Newton-type algorithm where a ridge is added to the Hessian in order to limit the step size. The expensive part of this algorithm is to solve the linear system $(H+\lambda I)x=g$, where H is the Hessian of the objective function and g its gradient. To do so, linear conjugate gradient algorithm may be used with a maximum of 20 iterations.

The Hessian with respect to $(w_{11}, w_{21}, \ldots, w_{dc}, \sigma_1, \ldots \sigma_d)$ is $$\begin{pmatrix} \ddots & & 0 & & \vdots \\ & \tilde{C}X_{sv_k}^T X_{sv_k} + D^{-1}(\sigma) & & D(w_k)D^{-2}(\sigma) & \\ 0 & & \ddots & & \vdots \\ \cdots & D(w_k)D^{-2}(\sigma) & \cdots & D(\Sigma_k w_{jk}^2 + t\sigma_j)D^{-3}(\sigma) \end{pmatrix},$$

where $X_{sv_k}$ is the matrix containing the support vectors of the k-th classifier and D(v) stands for the diagonal matrix with vector v on the diagonal. Note that most blocks are diagonals and that the bulk of the calculation in the Hessian vector product are multiplications by either X or $X^T$. The sparsity of those matrices is a key element for the algorithm to be fast.

Finally, a preconditioner may be used which is equal to the Hessian, but where $X^T X$ is replaced by its diagonal elements. Thus the preconditioner may be diagonal in each block. In a preconditioned conjugate gradient, the preconditioner needs to be inverted efficiently. And this is the case here because the blocks are only on the diagonal and last row and column.

Figure 5:
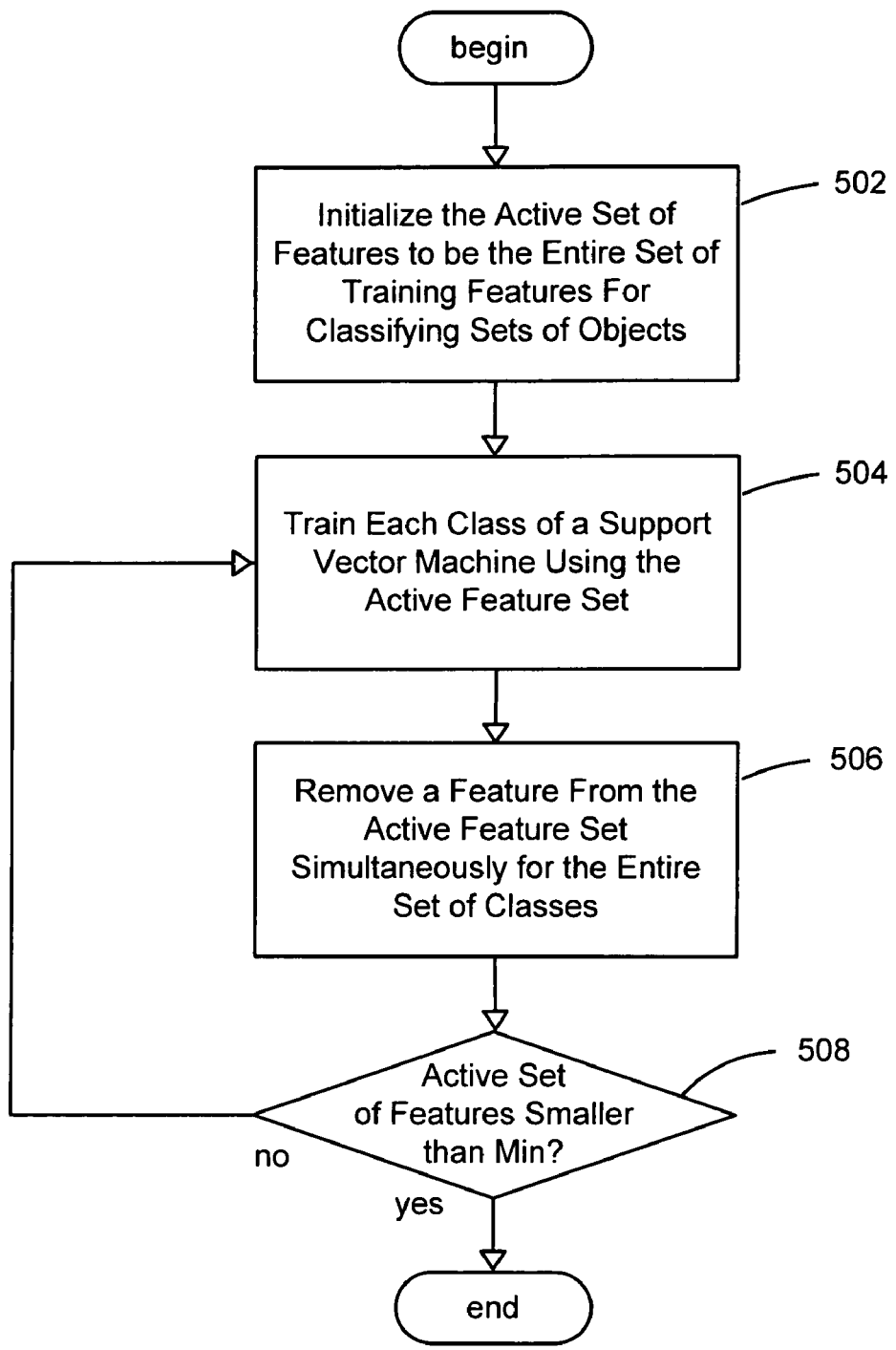
FIG. 5 is a flowchart generally representing the steps undertaken in one embodiment for training a support vector machine to find a common subset of features for classifying objects by removing at least one feature from the active set of features simultaneously for all the classes, in accordance with an aspect of the present invention.

Training a Multi-Class Support Vector Machine Using Multi-Class Recursive Feature Elimination In yet another embodiment, a small subset of features may be found by iteratively removing at least one feature simultaneously for all classes from an active set of features. This method can be viewed as a greedy optimization of $$\min \frac{1}{2} \sum_{k=1}^{c} \left( \sum_{j=1}^{d} \frac{w_{jk}^2}{\sigma_j} + \sum \sigma_j + \tilde{C} \sum_{i=1}^{n} l(y_{ik}(w_k \cdot x_i)) \right)$$

on the set of binary scaling factors. Initially the active feature set may represent the entire set of training features and the process of iteratively removing at least one feature from the active feature set may repeat until the active set of features does not go below a minimum number. FIG. 5 presents a flowchart generally representing the steps undertaken in this embodiment.

At step 502, an active set of features may be initialized to the entire set of training features for classifying sets of objects. Each class of a SVM may be trained using the active feature set at step 504. One or more features may be removed at step 506 from the active feature set simultaneously for the entire set of classes. The criterion used for determining which features may be removed from the active feature set may be features with the smallest values for $\Sigma_k w_{jk}^2$. It may then be determined whether the number of features in the active set of features is smaller than a minimum number at step 506. If so processing may be finished. Otherwise, processing may go back to step 504.

The connection of the above described embodiment with the method of scaling factors can be explained as follows. Instead of optimizing on $\sigma$, all of the values of $\sigma$ may be fixed to the value 1 and one of them may be set to zero based on the size of the gradient. More precisely, consider $T(w,\sigma)$ to denote the objective function $$\min \frac{1}{2} \sum_{k=1}^{c} \left( \sum_{j=1}^{d} \frac{w_{jk}^2}{\sigma_j} + \sum \sigma_j + \tilde{C} \sum_{i=1}^{n} l(y_{ik}(w_k \cdot x_i)) \right)$$

and define $V(\sigma)=\min_w T(w,\sigma)$.

Solving the objective function $$\min \frac{1}{2} \sum_{k=1}^{c} w_k^2 + \frac{C}{2} \sum_{i=1}^{n} l\left( y_{ik} \sum_{j=1}^{d} \sqrt{\sigma_j} \, w_{jk} x_{ij} \right)$$

is actually equivalent to minimizing V over $\sigma_j \in \{0,1\}$, $\Sigma \sigma_j = m$. Following a similar approach to RFE, start with all the features (i.e. $\sigma_j = 1$) and set one of the $\sigma_j$ to 0 such that V is minimized. This procedure may be iterated until m features remain. An approximate way of selecting the feature $\hat{j}$ to suppress is to make a linear approximation of V and select the smallest component of the gradient $$V: \hat{j} = \arg\max \frac{\partial V}{\partial \sigma_j} \bigg|_{\sigma=1}.$$

From the definition of V, the following equality may be derived:

$$\frac{\partial V}{\partial \sigma_j} = \underbrace{\frac{\partial T}{\partial w}}_{=0} \frac{\partial w}{\partial \sigma_j} + \frac{\partial T}{\partial \sigma_j} = \frac{1}{2}\left( -\sum_k w_{jk}^2 + 1 \right).$$

As a result, $$\hat{j} = \arg\max \sum_k w_{jk}^2.$$

The criterion is very intuitive: it removes features for which the weights are small.

CONCLUSION

Thus the present invention may efficiently perform simultaneous feature selection to find a small set of features which yield good performance for all the classifiers of a SVM. The system and method of the present invention may typically reduce the number of features by an order of magnitude or more from sets of training features and allow small feature sets to represent documents that may change rapidly and require classification to be performed online. Even in offline settings, such as the classifiers learning via active feedback from editors, representations of documents by small feature sets may support fast classification.

As can be seen from the foregoing detailed description, the present invention provides an improved system and method for training a multi-class support vector machine to select a common subset of features for classifying objects. A small subset of features may be found by iteratively selecting features from sets of training features simultaneously for all classes in various embodiments and may also be found by removing features simultaneously for all classes from an active set of features in other embodiments. Advantageously, an SVM may learn classifications function and perform simultaneous feature selection to find a small set of features which result in good performance for all the classifiers of a SVM. Such a system and method may support many web applications for multi-class and multi-label text classification, and may also be applied to other domains such as bioinformatics. As a result, the system and method provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for classification, comprising:
   a sparse multi-class support vector machine for using a common set of a plurality of features simultaneously selected for a plurality of classes using scaling factors iteratively from a plurality of training features representing each of the plurality of classes; and
   a storage operably coupled to the sparse multi-class support vector machine for storing the plurality of classes of objects classified by the common set of the plurality of features simultaneously selected for the plurality of classes using scaling factors iteratively from the plurality of training features representing each of the plurality of classes.

2. The system of claim 1 further comprising a multi-class support vector machine generator operably coupled to the storage for learning a plurality of classification functions to classify the plurality of objects into the plurality of classes.

3. The system of claim 1 further comprising a sparse support vector machine modeling engine operably coupled to the sparse multi-class support vector machine for training a multi-class support vector machine by simultaneously selecting the common subset of the plurality of features for the plurality of classes iteratively from the plurality of training features representing each of the plurality of classes.

4. A computer-readable medium having computer-executable components comprising the system of claim 1.

5. A computer-implemented method for classification, comprising:
   receiving a plurality of training features representing a plurality of objects from a plurality of classes;
   training a support vector machine using scaling factors by simultaneously selecting a common subset of features for the plurality of classes iteratively from the plurality of training features representing each of the plurality of classes for classifying the plurality of objects into the plurality of classes; and
   outputting the common subset of features simultaneously selected from the plurality of training features representing each of the plurality of classes for classifying the plurality of objects into the plurality of classes.

6. The method of claim 5 further comprising generating a sparse support vector machine by training the support vector machine using the common subset of features simultaneously selected from the plurality of training features representing each of the plurality of classes for classifying the plurality of objects into the plurality of classes.

7. The method of claim 6 further comprising outputting the sparse support vector machine for using the common subset of features simultaneously selected from the plurality of training features representing each of the plurality of classes for classifying an object.

8. The method of claim 5 wherein training the support vector machine by simultaneously selecting the common subset of features for the plurality of classes iteratively from the plurality of training features representing each of the plurality of classes comprises iteratively minimizing an objective function using scaling factors to ensure sparsity of the common subset of features.

9. The method of claim 5 wherein training the support vector machine by simultaneously selecting the common subset of features for the plurality of classes iteratively from the plurality of training features representing each of the plurality of classes comprises determining whether to remove each of the common subset of features for the plurality of classes selected iteratively from the plurality of training features.

10. The method of claim 5 wherein training the support vector machine by simultaneously selecting the common subset of features for the plurality of classes iteratively from the plurality of training features representing each of the plurality of classes comprises determining whether to add at least one feature from the plurality of training features to the common subset of features for the plurality of classes selected iteratively from the plurality of training features.

11. The method of claim 5 wherein training the support vector machine by simultaneously selecting the common subset of features for the plurality of classes iteratively from the plurality of training features representing each of the plurality of classes comprises determining whether the common subset of features has changed at each iteration of simultaneously selecting the common subset of features for the plurality of classes.

12. The method of claim 5 wherein training the support vector machine by simultaneously selecting the common subset of features for the plurality of classes iteratively from the plurality of training features representing each of the plurality of classes comprises increasing a constant of sparsity control at each iteration of simultaneously selecting the common subset of features for the plurality of classes.

13. The method of claim 5 wherein training the support vector machine by simultaneously selecting the common subset of features for the plurality of classes iteratively from the plurality of training features representing each of the plurality of classes comprises outputting a dimensional weight vector for the common subset of features for the plurality of classes.

14. The method of claim 5 wherein training the support vector machine by simultaneously selecting the common subset of features for the plurality of classes iteratively from the plurality of training features representing each of the plurality of classes comprises determining whether the number of the plurality of features of the common subset of features for the plurality of classes is greater than a maximum number of features.

15. A computer-readable medium having computer-executable instructions for performing the method of claim 5.

16. A computer system for classifying objects, comprising:
  means for finding each of a subset of a plurality of features simultaneously for a plurality of classes from a plurality of training features representing each of the plurality of classes for classifying a plurality of objects into the plurality of classes; and
  means for outputting the subset of the plurality of features for classifying the plurality of objects into the plurality of classes.

17. The computer system of claim 16 further comprising means for generating a sparse support vector machine using the subset of the plurality of features for classifying an object into at least one of the plurality of classes.

18. The computer system of claim 17 further comprising means for outputting the sparse support vector machine.

19. The computer system of claim 16 wherein means for finding each of the subset of the plurality of features simultaneously for the plurality of classes from the plurality of training features comprises means for iteratively selecting the subset of the plurality of features simultaneously for the plurality of classes from the plurality of training features.

20. The computer system of claim 16 wherein means for finding each of the subset of the plurality of features simultaneously for the plurality of classes from the plurality of training features comprises means for iteratively removing at least one feature simultaneously for the plurality of classes from the active set of the plurality of features.

* * * * *